(12) United States Patent
Achimon

(10) Patent No.: US 9,791,100 B1
(45) Date of Patent: *Oct. 17, 2017

(54) TEMPORARY MOUNTING DEVICE

(71) Applicant: Larry Don Achimon, Tom Bean, TX (US)

(72) Inventor: Larry Don Achimon, Tom Bean, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/201,550

(22) Filed: Jul. 4, 2016

Related U.S. Application Data

(63) Continuation-in-part of application No. 13/904,476, filed on May 29, 2013, now Pat. No. 9,383,058.

(51) Int. Cl.
*B60P 7/08* (2006.01)
*F16M 13/02* (2006.01)
*A01K 97/10* (2006.01)

(52) U.S. Cl.
CPC ........... *F16M 13/022* (2013.01); *A01K 97/10* (2013.01); *B60P 7/0823* (2013.01)

(58) Field of Classification Search
USPC ... 248/219.4, 219.3, 219.1, 218.4, 499, 500, 248/505; 24/71.1, 68 CD, 68 F, 68 PP, 24/68 FP, 71 TD, 69 CT, 68 R, 265 R, 24/265 CD, 265 AL; 42/106
See application file for complete search history.

(56) References Cited

U.S. PATENT DOCUMENTS

| | | | |
|---|---|---|---|
| 3,468,567 A | 9/1969 | Attwood et al. | |
| 3,564,743 A | 2/1971 | Gilmoure | |
| 4,548,377 A | 10/1985 | Huel | |
| 6,059,240 A | 5/2000 | Gorsuch | |
| 6,715,585 B1 | 4/2004 | Overbaugh | |
| 8,469,206 B2 | 6/2013 | Wilson | |
| 9,383,058 B1 * | 7/2016 | Achimon | B60P 7/0823 |
| 2004/0195478 A1 | 10/2004 | Baldasari | |
| 2009/0230266 A1 | 9/2009 | Hillstrom et al. | |
| 2010/0102184 A1 | 4/2010 | Gorsuch | |
| 2011/0049315 A1 | 3/2011 | Buckbee | |

* cited by examiner

*Primary Examiner* — Alfred Wujciak
(74) *Attorney, Agent, or Firm* — Grady K. Bergen; Griggs Bergen LLP

(57) ABSTRACT

A temporary mounting device for temporarily mounting an article to a mounting support structure utilizes an elongated, curved main stem member having a length and being formed from a resilient material, the curved main stem member being curved lengthwise along the length. A mounting member extends from a distal portion of v-mount legs of a pair of v-mounts that are coupled to the main stem member and has an attachment element configured to attach the article thereto. A selectively releasable tension strap releasably secures the device to a mounting support structure.

20 Claims, 4 Drawing Sheets

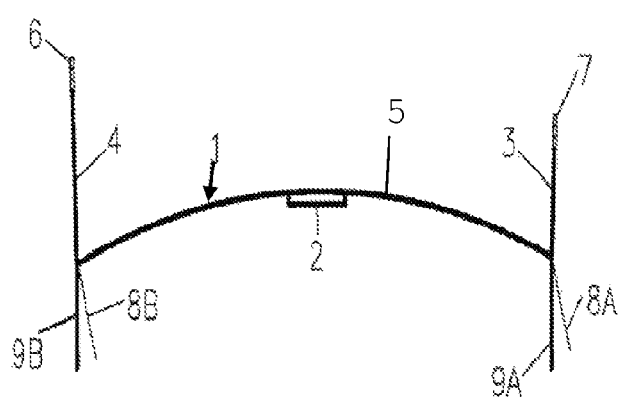
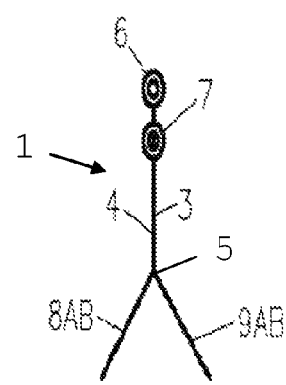
FIG. 1                    FIG. 2

TEMPORARY MOUNTING DEVICE

CROSS-REFERENCE TO RELATED APPLICATIONS

This application is a continuation-in-part of U.S. patent application Ser. No. 13/904,476, filed May 29, 2013, now U.S. Pat. No. 9,383,058, which is incorporated herein by reference in its entirety.

TECHNICAL FIELD

The present invention relates to a device for attaching various existing devices (such as fishing rod holders) to a pole, rail, dock, tree or other structure.

BACKGROUND

The ability to mount equipment on a pole, rail, dock or tree, such as a fishing rod holder, can be very difficult due to the nature of the attachment, and the diameter of the pole may vary from one location to another. Currently, specialized brackets are needed to fit specific diameters of poles or docks, and these devices require a permanent mounting process.

Many current methods of attaching existing devices to support structures (e.g. trees, docks, rails, poles, bridges, or posts) also must be bolted, drilled or tied using permanent or non-releasable means in order to ensure stability. These methods may damage the chosen structure or the gadget itself, and will not be as stable or as durable to withstand repeated uses within harsh and weathered environments. Other devices, such as those described in U.S. Pat. No. 5,632,461, do not provide durability or stability, or the ability to attach more than one device at a time.

For the reasons stated above and for other reasons stated below, there is a need for a mounting device that can be used with different structures of various configurations and that is capable of retaining more than one device, that is simple to mount, simple to remove, provides a number of different mounting options, and does not damage the surface to which it is attached.

BRIEF DESCRIPTION OF THE DRAWINGS

For a more complete understanding of the device, and the advantages thereof, reference is now made to the following descriptions taken in conjunction with the accompanying figures, in which:

FIG. 1 is a side perspective view of a mounting device constructed in accordance with one particular embodiment;

FIG. 2 is an elevational end view of the mounting device of FIG. 1;

In accordance with common practice, the various described features are not necessarily drawn to scale but are drawn to emphasize specific features relevant to the present invention. Reference numbers may denote similar elements throughout figures and text.

DETAILED DESCRIPTION

Figure 3:
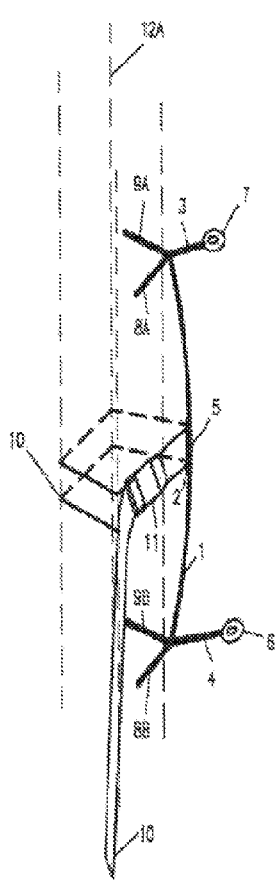
FIG. 3 is a side perspective view of the mounting device of FIG. 1, shown mounted to a section of square tubing.

A mounting device is provided for securing existing equipment to vertical, horizontal, or other oriented structures, such as trees, bridges, docks, posts, rails, etc. In particular embodiments, the mounting device comprises a curved resilient main stem with a v-mount attached along the length of the main stem for support against the chosen structure. Two mounting stems are to the device, in order to accommodate the existing gadgets. A strap may be attached to the midsection of the main stem that transfers tension from device to a chosen structure at the four contact points, while providing the ability to attach up to four existing gadgets via the mounting stems.

In particular embodiments, the device can be secured to virtually any vertical, horizontal, or other oriented structures, such as a post, dock, rail, tree, column, etc. The device can be quickly and easily mounted to the structure by placing the v-mount side of the main stem against the structure, extending a strap around the structure, securing the strap to a buckle or other fastener, and tensioning the strap. Additionally, the device is durable, lightweight, and strong and may be constructed with stainless spring steel or similar materials as the material.

As shown in FIG. 1, a temporary mounting device 1 provides a mechanism for securing devises, such as existing fishing rod holders, to vertical, horizontal, or other non-vertical and non-horizontal structures, such as trees (trunk or branches), poles, rails, columns, bridge structures, etc., without the need of a permanent means of attachment. As shown, the mounting device comprises a slightly curved main stem 5. The main stem 5, as well as other components of the device 1, may be formed from a resilient material, such as stainless spring steel. The main stem 5 is curved lengthwise along its length, as shown. The main stem 5 may have a circular or non-circular transverse cross section along all or a portion of its length. The cross-sectional diameter or width of the main stem member 5, as well as other members and components described herein, may be from ¼" to ½". In other embodiments, the main stem may have a diameter or width of from 5/16" to ⅜", with a particularly useful diameter or width being 5/16".

In particular embodiments, the main stem 5 may have a length of from 12" to 16", and more particularly from 13.5" to 14.5". Furthermore, the main stem 5 may be formed with a radius of curvature of from 10" to 26", and more particularly a radius of curvature of from 15" to 21".

In particular embodiments, the overall dimensions of the mounting device 1 may be from 12" to 18" in length and from 4.5" to 7.5" in width. In certain embodiments, the mounting device may be from 13.5" to 16.5" in length and from 5" to 7" in width. These dimensions have been shown to provide an optimal strength and size, according to the material, stability and durability possible for such a device and its uses.

As shown in FIG. 1, an attachment point or device 2 is provided along the length of the main stem 5 between the v-mounts, such as at or near the center of the main stem 5. The attachment point 2 may be configured as a loop or apertured structure having an opening or aperture of from 0.25" to 2" in length that is provided or attached to the inside or concave side of the main stem 5. In other embodiments, the attachment point has an aperture or opening of from 0.5" to 1.5" in length.

A pair of v-mounts of the device 1 are each formed by a pair of v-mount legs or members 8A, 9A and 8B, 9B, respectively, that are joined together at their proximal ends at an apex to the main stem 5. The v-mounts are longitudinally spaced apart along the length of the stem 5 wherein the curved main stem member 5 is curved outwardly away from the two v-mounts. The v-mounts are configured to engage and abut against the surface of a supporting structure to which the device is mounted and secured.

In the embodiment shown, the v-mounts are provided at or near the ends of the main stem 5. Furthermore, one or all of v-mounts are oriented at an angle relative to the tangential line at the point at which they attach at the main stem 5 or, in certain embodiments, a line drawn between the ends of the main stem 5, of more than 90 degrees so that the distal ends of v-mount legs 8A, 9A and 8B, 9B project or extend beyond the length of the main stem 5 a distance. In certain embodiments, the angle of each v-mount in relation to the main stem 5 or, in certain embodiments, a line drawn between the ends of the main stem 5, is 91 degree to 110 degree. In a more specific embodiment, the angle of each v-mount in relation to the main stem 5 at its point of attachment or, in certain embodiments, a line drawn between the ends of the main stem, is from 95 degree to 105 degree. The two v-mounts, in relation to the chosen support structure, provide maximum amount of stability vertically and horizontally utilizing tension and the contact points. In other embodiments, however, the angle of the v-mounts to the main stem 5 or the line drawn between the ends of the main stem 5 may be 90 degrees or less.

FIG. 2 shows the angle of the legs 8A, 9A and 8B, 9B of the v-mounts in relation to one another. In certain embodiments, the angle between the v-mount legs may be less than 90 degrees. In certain embodiments the angle of the v-mount legs may be from 65 degrees to 89 degrees. In other embodiments, the angle of the v-mount legs may be from 75 degree to 85 degree. The less-than 90 degree angle of the v-mount legs allows for a wider range of contact on smaller diameter structures, including round or square shaped structures. In other embodiments, however, the angle of the legs of each v-mount may be 90 degrees or more.

Figure 4:
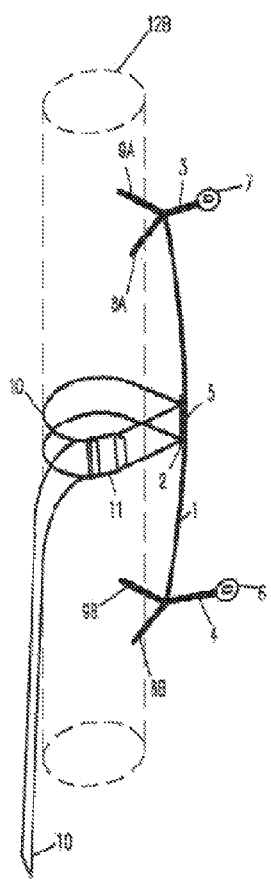
FIG. 4 is a side perspective view of the mounting device of FIG. 1, shown mounted to a section of a round pole.

FIGS. 3 & 4 show the device 1 attached to structures 12A and 12B, respectively. The device 1 is secured to these structures by a flexible strap 10 that passes through the aperture of or is otherwise secured to the attachment structure 2, with the inward or concave side of the curve of the main stem 5 facing towards the structure. As the strap 10 is tightened around the structure at the securing device 11 (e.g., a buckle or other tightening fastener), the curved main stem 5 is deflected and pulled inward slightly, thus producing an outward biasing force and tension on the strap, with the radius of the main stem 5 being slightly increased. This transfers the tension to each end of the stem 5 to the v-mount legs 8A, 9A and 8B, 9B contact points to the structure to which the device 1 is secured.

As shown in FIGS. 1 and 2, a device 1 includes one or more mounting stems or members 3, 4 that extend from the main stem 5. In the embodiment shown, the mounting stems 3, 4 are longitudinally spaced apart along the length of the main stem 5 and extend from the apex of at least one of said v-mounts where it is joined at the main stem 5. The mounting members 3, 4 may each have lengths of 1" to 6". In certain embodiments, the mounting members 3, 4 may have a length of from 2" to 4". In many embodiments, the mounting members 3, 4 have unequal in length in order to accommodate two gadgets or fishing rod holders without interfering with each gadget. In other embodiments, the mounting members 3, 4 may have equal or similar lengths.

As shown in FIG. 1, the mounting stems 3, 4 are oriented at an angle of from 60 degrees to 90 degrees in relation to a tangential line of the main stem member 5 at the point of attachment or, in certain embodiments, a line drawn between the ends of the main stem member 5. In particular embodiments, the mounting stems 3, 4 are oriented at from 75 degrees to 85 degrees in relation to the main stem member 5 or, in certain embodiments, a line drawn between the ends of the main stem member 5.

As shown in FIGS. 1 and 2, the mounting stems 3, 4 further comprise a mounting structures or attachment elements 6, 7. The mounting elements 6, 7 may have a width or diameter of between 0.625" to 0.75" in diameter with a hole or aperture sized or configured to accommodate bolts or fasteners with 0.3125" to 0.375" diameter shanks that are received therein. These sizes are chosen in order to accommodate the widest range of existing gadgets and devices.

As illustrated in FIGS. 3 and 4, a flexible mounting strap 10 of the device 1 is used for securing the temporary mounting device 1 to various structures. The strap 10 may be formed from various materials, such as webbing, and a securing device 11, such as a self-buckling and tension device, which is attached at one end of the mounting strap material and looped through the other end of the securing device 11, so as to provide the ability to selectively increase or decrease tension of the device 10 against the chosen structure to which it is coupled.

In particular embodiments, the mounting strap is passed through the mounting stem 2 and around the chosen structure to attach via the self-buckling and tensioning device.

FIG. 3 shows a side view of the temporary mounting device 1 with strap 10 and securing device 11 attached to square-shaped tubing 12 A.

FIG. 4 shows a side view of the temporary mounting device 1 with strap 10 and securing device 11 attached to cylindrical-shaped tubing 12 B.

Figure 5:
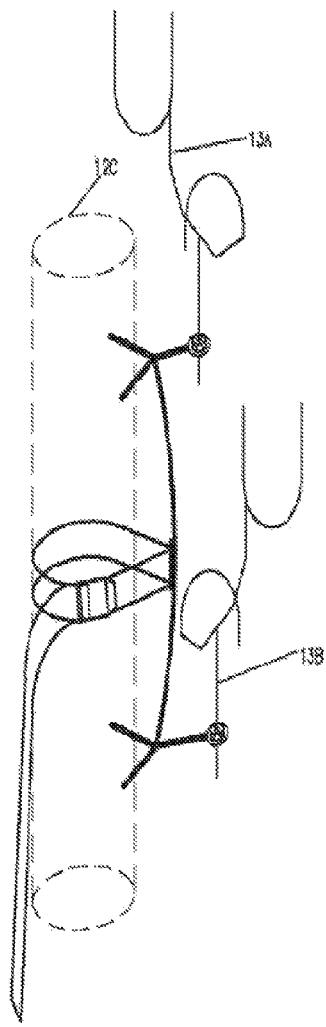
FIG. 5 is a side perspective view of a mounting device of FIG. 1 mounted to a section of a round pole and shown with fishing rod holders fastened to the device.

FIG. 5 shows a side view of the temporary mounting device 1 with strap 10 and securing device 11 attached to cylindrical-shaped tubing 12 C, along with two existing fishing rod holders 13 A, 13 B secured to the mounting structures 6, 7, respectively.

Figure 6:
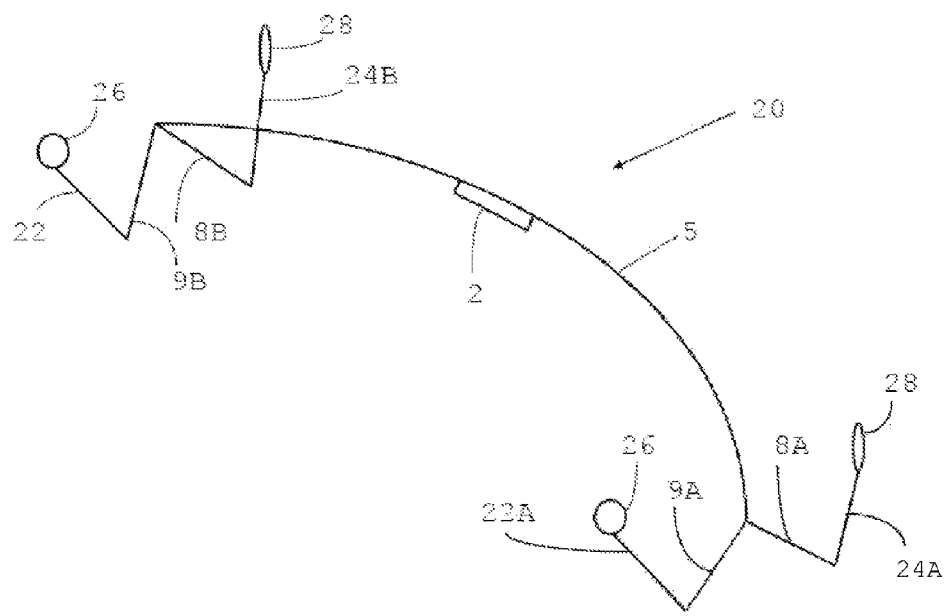
FIG. 6 is side perspective view of a mounting device constructed in accordance with another embodiment.
Figure 7:
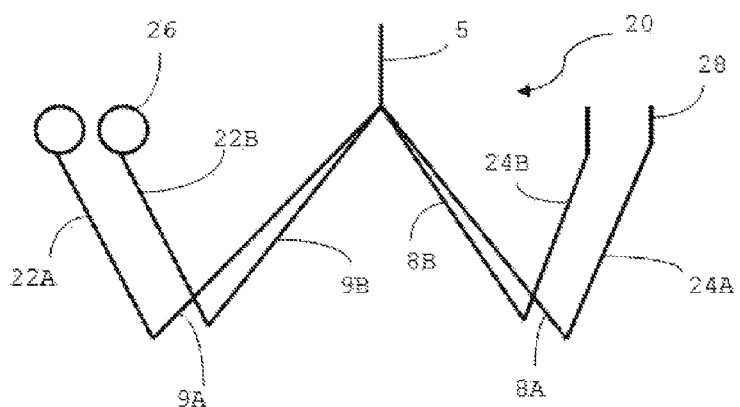
FIG. 7 is an elevational end view of the mounting device of FIG. 6.

Referring to FIGS. 6 and 7, another embodiment of a mounting device 20 is shown, with similar components labeled with the same reference numerals. The device 20 includes a main stem member 5 and v-mounts 22 formed by the pairs of v-mount legs 8A, 9A and 8B, 9B. As with the device 1, the v-mount legs 8A, 9A and 8B, 9B are each joined at a proximal end to the main stem member 5 at an apex, as shown.

In the embodiment of the device 20, mounting stems 22A, 24A and 22B, 24B are joined and extend upward and outward from the distal portions or distal ends of the v-mount legs 8A, 9A and 8B, 9B, respectively, as shown in the figures. The angle of the mounting stems 22A, 24A and 22B, 24B in relation to the v-mount legs to which they are attached may be an acute angle or an obtuse angle. In particular embodiments this angle may range from 30 degrees to less than 135 degrees. In more particular embodiments, the angle may range from 35 degrees to 133 degrees. In the embodiment shown, the mounting stems 22A, 24A and 22B, 24B are joined to the terminal distal end of the v-mount legs 8A, 8B and 9A, 9B so that the apex where the mounting stems and v-mount legs join creates the area of the v-mount leg that abuts against or engages the surface of the mounting structure to which the device 20 is mounted and secured. In some embodiments, v-mounts, v-mount legs and mounting stems may be formed from a continuous length of resilient material (e.g., spring steel) that is bent or otherwise formed in the desired shape.

The length of each of the mounting stems 22A, 24A and 22B, 24B may be the same or different. Additionally, each of the mounting stems 22A, 24A and 22B, 24B may be oriented at the same or different angles relative to the v-mount legs to which they are attached. As shown in FIGS. 6 and 7, the mounting stems 24A, 24B on one side of the device 20 are longer than the mounting stems 22A, 22B located on the other side and are oriented at a different angle relative to the v-mount legs to which they are attached.

Each mounting stem 22A, 24A and 22B, 24B is provided with mounting structures or attachment elements 26, 28, respectively. As shown, the elements 26, 28 are provided at the distal end of each mounting stem. The attachment elements 26, 28 may be provided with a hole or aperture sized or configured to accommodate bolts or fasteners, as with the attachment members 3, 4, previously discussed. Other configurations for the attachment elements 26, 28 may also be provided for coupling to various types and styles of fastening mechanisms such that the attachment elements 26, 28 do not utilize holes or apertures. In the embodiment shown, the attachment elements 26, 28 are oriented differently, with the opening of the holes or apertures of the attachment members 26 being oriented longitudinally parallel with respect to a longitudinal axis of the device 22 and the opening of the holes or apertures of the attachment members 28 being oriented transverse to the longitudinal axis of the device 22. Each attachment element 26, 28 may have a different orientation from one another. Additionally, each attachment element 26, 28 may be selectively pivotally attached to the main stem member so that it can be selectively oriented at different orientations, with releasable fastening means being provided to keep the attachment elements 26, 28 in a selected position once the desired orientation is achieved.

Figure 8:
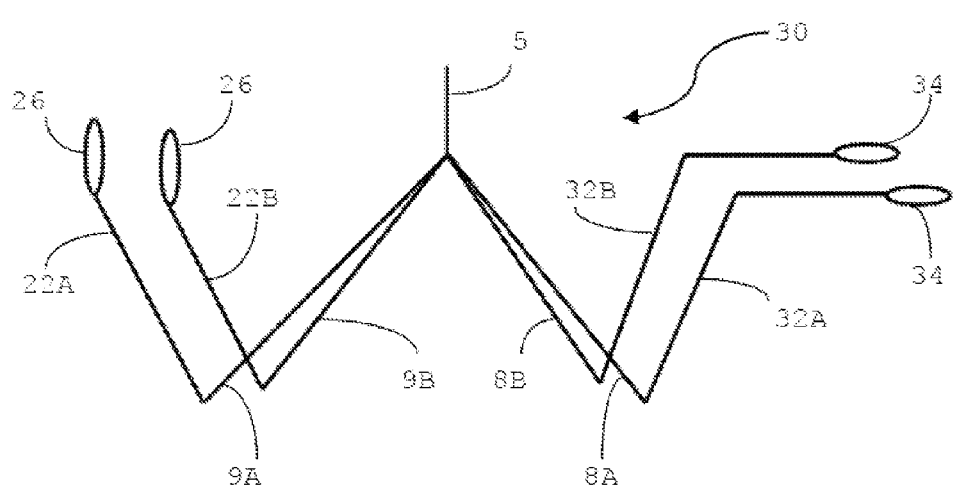
FIG. 8 is an elevational end view of a mounting device constructed in accordance with another embodiment.

Referring to FIG. 8, another embodiment of a device 30 is shown that is similar to the device 20 and with similar elements labeled with the same reference numerals. As shown in FIG. 8, each of the v-mount legs 8A, 8B on one side of the device 30 is provided with mounting stems 32A, 32B. The mounting stems 32A, 32B are similar to the mounting stems 24A, 24B of the device 20, but the distal end portions of the mounting stems 24A, 24B are bent or angled away from the remainder of the mounting stem members 24A, 24B. The mounting stems 32A, 32B are also provided with attachment elements 34. As shown, the openings of the attachment members 34 are shown oriented perpendicular and non-transverse to a longitudinal axis of the device 30, as shown in FIG. 8.

All or a portion of the main stem member, v-mounts, mounting stems, etc. of the devices described herein may be provided with a polymeric or elastomeric coating to provide both anti-slip characteristics and/or to protect the underlying material from corrosion and the like.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A temporary mounting device for temporarily mounting an article to a mounting support structure, the temporary mounting device comprising:
    an elongated, curved main stem member having a length and being formed from a resilient material, the curved main stem member being curved lengthwise along the length;
    two v-mounts formed from a pair of v-mount legs that are joined together at a proximal end of the legs at an apex, the two v-mounts being coupled to and longitudinally spaced apart along the length of the main stem member, and wherein the curved main stem member is curved outwardly away from the two v-mounts;
    a mounting member extending from a distal portion of at least one of said v-mount legs, the mounting member having an attachment element configured to attach the article thereto; and
    a selectively releasable tension strap that releasably secures to the curved main stem member at a position along the length of the curved main stem member between the v-mounts and that is configured to be secured around the mounting support structure for securing the temporary mounting device to said support structure when the temporary mounting device is in a mounted configuration, the v-mounts being configured to engage a surface or surfaces of the mounting structure when the temporary mounting device is in said mounted configuration, and wherein the curved main stem member provides an outward biasing force when the tension strap is secured around the support structure to produce tension on the tension strap when in the mounted configuration.

2. The temporary mounting device of claim 1, wherein:
    the curved main stem member is formed from spring steel having a diameter of from 5/16 to 3/8 of an inch.

3. The temporary mounting device of claim 1, wherein:
    the curved main stem member has a radius of curvature of from 10 to 26 inches.

4. The temporary mounting device of claim 3, wherein:
    the curved main stem member has a length of from 12 to 16 inches.

5. The temporary mounting device of claim 1, wherein:
    there is a mounting member that extends from the distal portion of at least two of said v-mount legs, each mounting member being oriented at a different orientation relative to the v-mount from which the mounting member extends.

6. The temporary mounting device of claim 1, wherein:
    there is a mounting member that extends from the distal portion of at least two of said v-mount legs, each mounting member having an attachment element that is oriented at a different orientation from the other.

7. The temporary mounting device of claim 1, further comprising:
    a strap attachment loop that is coupled to the curved main stem member, the tension strap securing to the curved main stem member through the strap attachment loop.

8. The temporary mounting device of claim 1, wherein:
    there is a mounting member extending from the distal portion of each of said v-mount legs.

9. The temporary mounting device of claim 1, wherein:
    the v-mount legs of each v-mount are positioned at an angle of less than 90° relative to one another.

10. The temporary mounting device of claim 1, wherein:
the elongated, curved main stem member is formed from a resilient spring steel material having a diameter of from 5/16 to 3/8 of an inch and a length of from 12 to 16 inches; and
the two v-mounts are coupled at the apex to opposite ends of the main stem member, the v-mount legs of each v-mount extends from the apex at an angle of less than 90°, and wherein the curved main stem member is curved outwardly away from the two v-mounts along the length of the main stem member, the curved main stem member having a radius of curvature of from 10 to 26 inches.

11. The temporary mounting device of claim 10, wherein:
the v-mount legs of each v-mount are positioned at an angle of from 65° to 89° relative to one another.

12. The temporary mounting device of claim 10, further comprising:
the v-mounts are attached to the main stem member at an angle of from 91° to 110° relative to the main stem member.

13. The temporary mounting device of claim 10, wherein:
the curved main stem member has a radius of curvature of from 10 to 21 inches.

14. The temporary mounting device of claim 10, wherein:
the v-mounts are attached to the main stem member at an angle of from 95° to 105° relative to the main stem member.

15. A temporary mounting device for temporarily mounting an article to a mounting support structure, the temporary mounting device comprising:
an elongated, curved, main stem member having a length from 12 to 16 inches, the curved main stem member being curved lengthwise along the length with a radius of curvature of from 10 to 26 inches, the elongated, curved, main stem member being formed from a resilient spring steel material having a diameter of from 5/16 to 3/8 of an inch and a length of from 12 to 16 inches;
two v-mounts formed from a pair of v-mount legs that are joined together at a proximal end of the legs at an apex, the two v-mounts being coupled to and longitudinally spaced apart along the length of the main stem member, the v-mount legs of each v-mount being positioned at an angle of from 65° to 89° relative to one another, and wherein the curved main stem member is curved outwardly away from the two v-mounts;
a mounting member extending from a distal portion of at least one of said v-mounts legs, the mounting member having an attachment element configured to attach the article thereto; and
a selectively releasable tension strap that releasably secures to the curved main stem member at a position along the length of the curved main stem member between the v-mounts and that is configured to be secured around the mounting support structure for securing the temporary mounting device to said support structure when the temporary mounting device is in a mounted configuration, the v-mounts being configured to engage a surface or surfaces of the mounting structure when the temporary mounting device is in said mounted configuration, and wherein the curved main stem member provides an outward biasing force when the tension strap is secured around the support structure to produce tension on the tension strap when in the mounted configuration.

16. The temporary mounting device of claim 15, wherein:
there is a mounting member that extends from the distal portion of at least two of said v-mount legs, each mounting member being oriented at a different orientation relative to the v-mount from which the mounting member extends.

17. The temporary mounting device of claim 15, wherein:
there is a mounting member that extends from the distal portion of at least two of said v-mount legs, each mounting member having an attachment element that is oriented at a different orientation from the other.

18. The temporary mounting device of claim 15, wherein:
the curved main stem member has a radius of curvature of from 10 to 21 inches.

19. A temporary mounting device for temporarily mounting an article to a mounting support structure, the temporary mounting device comprising:
an elongated, curved, main stem member having a length from 12 to 16 inches, the curved main stem member being curved lengthwise along the length with a radius of curvature of from 10 to 26 inches, the elongated, curved, main stem member being formed from a resilient spring steel material having a diameter of from 5/16 to 3/8 of an inch and a length of from 12 to 16 inches;
two v-mounts formed from a pair of v-mount legs that are joined together at a proximal end of the legs at an apex, the two v-mounts being coupled to and longitudinally spaced apart along the length of the main stem member, the v-mount legs of each v-mount being positioned at an angle of from 65° to 89° relative to one another, the v-mounts being attached to the main stem member at an angle of from 91° to 110° relative to the main stem member, and wherein the curved main stem member is curved outwardly away from the two v-mounts;
a mounting member extending from a distal portion of at least one of said v-mounts legs, the mounting member having an attachment element configured to attach the article thereto;
a selectively releasable tension strap that releasably secures to the curved main stem member at a position along the length of the curved main stem member between the v-mounts and that is configured to be secured around the mounting support structure for securing the temporary mounting device to said support structure when the temporary mounting device is in a mounted configuration, the v-mounts being configured to engage a surface or surfaces of the mounting structure when the temporary mounting device is in said mounted configuration, and wherein the curved main stem member provides an outward biasing force when the tension strap is secured around the support structure to produce tension on the tension strap when in the mounted configuration.

20. The temporary mounting device of claim 19, wherein:
there is a mounting member that extends from the distal portion of at least two of said v-mount legs, each mounting member having an attachment element that is oriented at a different orientation from the other.

* * * * *